Jan. 26, 1960 V. L. SMITHERS 2,922,254
CUT FLOWER HOLDER
Filed Oct. 10, 1957

INVENTOR.
VERNON L. SMITHERS
BY
ATTORNEYS

United States Patent Office 2,922,254
Patented Jan. 26, 1960

2,922,254
CUT FLOWER HOLDER

Vernon L. Smithers, Akron, Ohio, assignor to The V. L. Smithers Manufacturing Company, Akron, Ohio, a corporation of Ohio Application October 10, 1957, Serial No. 689,332

5 Claims. (Cl. 47—41)

This invention relates to a holder having a body of water absorbent and retentive material held therein which is particularly adapted to supply moisture to the stems of cut flowers inserted in the material. The holder is designed so that it is in one piece and is provided with means to hold a block of the material firmly so that it will support the flowers and, when the flowers are inserted in the block, the block will be securely held in position.

The absorbent material is preferably a water-absorbent block of foam made from a synthetic resin preferably such as a phenolic condensation product, of which the phenol-formaldehyde resin is an example. The foamed block may also be made of a urea-formaldehyde composition. The requirements are that when treated as will be described the resin shall be capable of being converted into a cellular body which is water absorbent and retentive, and may be readily penetrated by the stems of flowers and have sufficient rigidity and strength to support the flowers.

The foamed materials set forth above are incapable of absorbing water without manipulation and in order to avoid the necessity of mechanically forcing water into the myriad of minute cells constituting the structure, the block should preferably be treated in accordance with a procedure such as described in my prior Patent No. 2,753,277, although it is not intended to limit the invention to the use of materials made under that patent, and which are known in the trade under the name "Oasis." A block of this material has a degree of compressibility which adapts it to the purposes of this invention.

When a block of material such as covered in the said patent is employed, it will be treated on its surfaces with a wetting agent in the manner described therein and to which reference is made for a more complete description.

The purpose of this invention is to provide a convenient holder for the material which is inexpensive and may be expendible after each use. This will serve to do away with the necessity for the florist to send floral arrangements in vases or containers which increase the cost and are either returned to the florist or constitute a considerable outlay.

The holder may be of any material but is preferably made from any well-known plastic which is capable of being molded, preferably by the injection molding process.

The invention is in the nature of an improvement over the device shown in my prior application Serial No. 671,162, filed July 11, 1957, now Patent No. 2,891,354.

In the drawings there is shown the best known and preferred form of my invention, it being understood that changes and modifications may be made in the structure shown without departing from the teachings or sacrificing any of the beneficial results of the invention.

Figure 1:
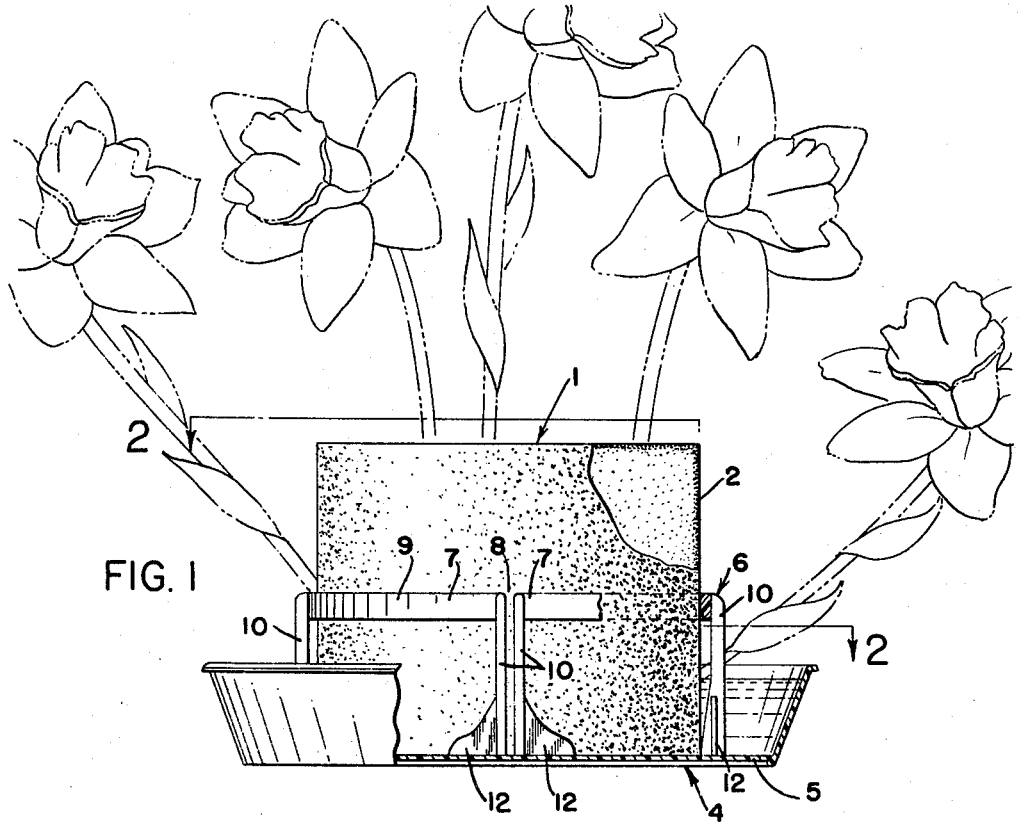
Fig. 1 is a side elevation the of complete assembly of the holder and block of absorbent material, parts being broken away and showing the manner in which flowers may be held in a floral arrangement.
Figure 2:
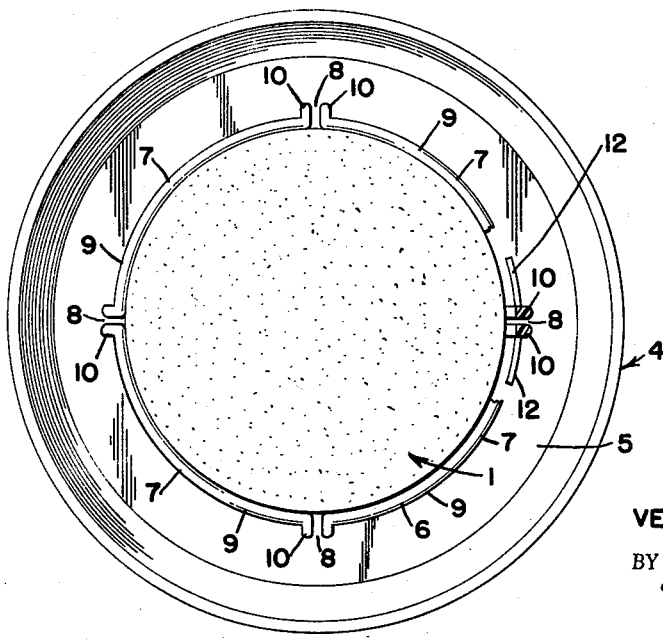
Fig. 2 is a top view thereof taken on the line 2—2 of Fig. 1.

The block, which may be of any of the aforesaid materials, is shown at 1. It is preferably made of a foamed phenol-formaldehyde resin having a multitude of minute cells which will entrap and hold water for a period which will outlast the life of the cut flowers. In order to secure a thorough penetration of water into the interior of the block, and also the maximum amount of retained water with the lowest rate of evaporation, the exterior surfaces of the block are treated with a wetting agent, such for example as described in my prior patent above referred to. The presence of the wetting agent about all surfaces of the block is indicated by the more heavily shaded area 2.

The holder is given the general reference numeral 4. It is in one piece and is preferably molded from any of the well-known plastic materials which are available and are capable of being formed by injection molding. Rigid type polyethylene or any of the modern polyvinyl chlorides or vinyl vinylidene chlorides are suitable, as are high impact polystyrene or regular polystyrene.

The holder is formed with a lower saucer-like portion 5 which is deep enough to retain water which may ooze out of the block or be supplied thereto to supplement the retained water, although added water is not generally required.

Integrally molded with the base is a vertical enclosure 6 which serves as a means for retaining the block 1 in place. For convenience in molding and also to provide a certain elasticity to the part of the holder which encloses the lower part of the block, the enclosure is made in a number of segments 7, usually four, which are separated as at 8. These segments are slightly elastic so they may be deflected in removing the structure from the mold and also better to grip the block. Each segment is a framework enclosure and consists of an upper bar 9 at each end of which is a supporting post 10 so that the major portion of each segment is open to the base. Fins or webs 12 brace the segments. The enclosure should preferably reach about half way up the sides of the block.

Usually the block 1 is cylindrical as shown, but this is not necessary as any convenient form may be adopted. The cross sectional area of the block should be slightly greater than the cross sectional area of the enclosure so that when the block is located in the enclosure there will be sufficient pressure exerted by the enclosure to hold the block in position.

The block should first be thoroughly saturated with water and then inserted in the enclosure. The florist or housewife may then insert the stems of the flowers in the block, which is exposed on the top and sides so as to allow for any arrangement. Some of the flowers should be inserted through the openings in the segments to make a proper floral arrangement and those flowers, such as the one on the right in Fig. 1, will serve to retain the block in the holder.

It will be seen that a very inexpensive flower holder has been designed, which may be used in lieu of vases and in lieu of the commonly employed frogs, pin holders or wire mesh which have heretofore been used with receptacles to hold flowers in place. The whole unit may be thrown away after a single use or it may be reused repeatedly. It is practical to use the block 1 to support candles, candle holders or other ornamental accessories such as are frequently used in the creation of floral displays.

What is claimed is:

1. A device for holding cut flowers comprising a saucer-like base, integral open formations rising from the base and forming an enclosure, a block of water absorbent and retentive material located within the enclosure, the sides and top of the block being exposed to receive and support the stems of flowers inserted therein, and said open formations having cross bars at their upper ends to engage flower stems inserted in the sides of the block and prevent withdrawal of the block from the holder.

2. A device for holding cut flowers comprising a saucer-like base, integral open formations rising from the base and forming an enclosure, a block of water absorbent and retentive material located within the enclosure, said block being formed of a foamed synthetic resin having its outer surfaces treated with a wetting agent, the sides and top of the block being exposed to receive and support the stems of flowers inserted therein, and said open formations having cross bars at their upper ends to engage flower stems inserted in the sides of the block and prevent withdrawal of the block from the holder.

3. A device for holding cut flowers comprising a saucer-like base, integral yielding segmental open formations rising from the base and forming an enclosure, a block of water absorbent and retentive material located in the enclosure and held therein by the gripping action of said segmental formations, the sides and top of the block being exposed to receive and support the stems of flowers inserted therein, and said open formations having cross bars at their upper ends to engage flower stems inserted in the sides of the block and prevent withdrawal of the block from the holder.

4. A device for holding cut flowers comprising a saucer-like base, integral yielding segmental open formations rising from the base and forming an enclosure, a block of water absorbent and retentive material located in the enclosure and held therein by the gripping action of said segmental formations, said block being formed of a foamed synthetic resin having its outer surfaces treated with a wetting agent, the sides and top of the block being exposed to receive and support the stems of flowers inserted therein, and said open formations having cross bars at their upper ends to engage flower stems inserted in the sides of the block and prevent withdrawal of the block from the holder.

5. A device for holding cut flowers comprising a saucer-like base, integral open formations rising from the base and forming an enclosure, a block of water absorbent and retentive material located within the enclosure, said block being formed of a foamed synthetic material selected from the group consisting of urea-formaldehyde and a phenolic condensation resin, the sides and top of the block being exposed to receive and support the stems of flowers inserted therein, and said open formations having cross bars at their upper ends to engage flower stems inserted in the sides of the block and prevent withdrawal of the block from the holder.

References Cited in the file of this patent

UNITED STATES PATENTS

| | | |
|---|---|---|
| 1,596,716 | Clarke | Aug. 17, 1926 |
| 1,651,772 | Jackson | Dec. 6, 1927 |
| 2,504,031 | Manning | Apr. 11, 1950 |
| 2,637,143 | Reynolds | May 5, 1953 |
| 2,753,277 | Smithers | July 3, 1956 |

FOREIGN PATENTS

| | | |
|---|---|---|
| 19,249 | Great Britain | Oct. 26, 1892 |